US008505105B2

(12) United States Patent
Fellers et al.

(10) Patent No.: US 8,505,105 B2
(45) Date of Patent: Aug. 6, 2013

(54) MANAGING SIGNATURE PAGES OF A TRANSACTIONAL DEAL USING A TAXONOMY DISPLAYABLE BY A COMPUTING DEVICE

(75) Inventors: Charles Fellers, Charlottesville, VA (US); James Gregory Herrington, Charlottesville, VA (US)

(73) Assignee: Efficiency Products LLC, Charlottesville, VA (US)

( * ) Notice: Subject to any disclaimer, the term of this patent is extended or adjusted under 35 U.S.C. 154(b) by 1072 days.

(21) Appl. No.: 12/412,952

(22) Filed: Mar. 27, 2009

(65) Prior Publication Data
US 2010/0251385 A1    Sep. 30, 2010

(51) Int. Cl.
G06F 11/00    (2006.01)

(52) U.S. Cl.
USPC ............................................. 726/28

(58) Field of Classification Search
USPC .................. 726/27–30; 707/781–785
See application file for complete search history.

(56) References Cited

U.S. PATENT DOCUMENTS

| 5,818,955 | A | * | 10/1998 | Smithies et al. | 382/115 |
| 6,134,534 | A | * | 10/2000 | Walker et al. | 705/5 |
| 6,594,633 | B1 | * | 7/2003 | Broerman | 705/313 |
| 7,085,735 | B1 | * | 8/2006 | Hall et al. | 705/4 |
| 7,146,343 | B2 | | 12/2006 | Donahue | |
| 7,200,605 | B2 | * | 4/2007 | Baker | 1/1 |
| 2003/0233310 | A1 | | 12/2003 | Stavrovski | |
| 2005/0240529 | A1 | | 10/2005 | Thomas | |

* cited by examiner

*Primary Examiner* — Beemnet Dada
(74) *Attorney, Agent, or Firm* — Nixon Peabody LLP; Jeffrey L. Costellia

(57) ABSTRACT

Embodiments of the present invention relate to a computer-implemented method, system, and computer-readable medium for managing a collaborative deal transaction process that provides for tracking and managing signature pages of a deal transaction using a taxonomy displayable by a computing device, including receiving a list of users that are authorized to access the deal transaction, the list including an identifier associated with each of the users, storing the list of authorized users, parsing the identifier associated with each user, grouping the users according to parties based on the identifier, creating a taxonomy including a listing of documents relevant to the deal and a listing of the parties of the deal, receiving at least one document, and storing relevant pages of the at least one document, wherein each page is associated with at least one relevant party in the taxonomy.

59 Claims, 3 Drawing Sheets

MANAGING SIGNATURE PAGES OF A TRANSACTIONAL DEAL USING A TAXONOMY DISPLAYABLE BY A COMPUTING DEVICE

BACKGROUND OF THE INVENTION

1. Field of the Invention

The invention relates to a method, system, and computer-readable medium for managing of a collaborative deal transaction that provides for tracking and managing signature pages of a deal transaction using a taxonomy that is displayable by a computing device.

2. Description of Related Art

Many aspects of corporate finance strategy and management, whether it be mergers, acquisitions, fundraising, insolvency, corporate restructuring, joint ventures, or closing deals, require document intensive agreements, as well as a multiplicity of other documents required by the due diligence process, and related contracts during these types of business transactions.

Historically, physical data rooms have been used during the course of these types of document intensive transactions. This type of traditional data room is literally a physically secure room that houses the copious transactional documents in boxes or file folders. The physical data room usually receives continual monitoring, and is located in the office of a host vendor, solicitor, or law firm. During the closing process, members of the various parties must visit the physical data room to inspect and report on the various documents housed therein. Often only one individual at a time is permitted entry to the physical data room, and if new documents or different versions of existing documents are required, a hardcopy is hand delivered to the physical data room via courier. Teams involved in large transactions are normally flown to the city in which the physical data room resides, so that the various team members and experts are available "on-call" throughout the transactional process. The use of a physical data room during a deal transaction obviously requires a large expenditure of time and resources from all parties involved.

Recently, virtual data rooms have been gaining popularity as an alternate means for storing the documents of a deal transaction. A conventional virtual data room (VDR) is essentially a secure Internet website where the deal documents are uploaded and stored. VDR's allows security permissions to different users, according to their particular role in the deal, much like a security guard in the physical data room. VDR's afford a means to provide access to the necessary documents that can be accessed via the Internet, and obviates many of the costs associated with using a physical data room for storing the plethora of documents required for a deal transaction. However, conventional VDR's do not provide an adequate and/or efficient means to track and/or manage the status of various documents throughout the duration of the deal transaction.

SUMMARY OF THE INVENTION

The present invention facilitates the management of a collaborative deal transaction process that provides for tracking and managing signature pages of a deal transaction using a taxonomy that is displayable by a computing device. Accordingly, the invention permits the creation of deal stages that allow the progress of deal transactions to be the easily tracked and managed.

Embodiments of the present invention relate to a computer-implemented method for managing a collaborative deal transaction process that provides for tracking and managing signature pages of a deal transaction using a taxonomy displayable by a computing device, including receiving a list of users that are authorized to access the deal transaction, the list including an identifier associated with each of the users, storing the list of authorized users, parsing the identifier associated with each user, grouping the users according to parties based on the identifier, creating a taxonomy including a listing of documents relevant to the deal and a listing of the parties of the deal, receiving at least one document, and storing relevant pages of the at least one document, wherein each page is associated with at least one relevant party in the taxonomy.

The embodiments also relate to a system for managing a collaborative deal closing process that provides a means for tracking and managing signature pages of a closing deal using a taxonomy displayable by a computing device including means for receiving a list of users that are authorized to access the closing deal, the list including an identifier associated with each of the users, means for storing the list of authorized users, means for parsing the identifier associated with each user, means for grouping the users according to parties based on the identifier, means for creating a taxonomy including a listing of documents relevant to the deal and a listing of the parties of the deal, means for receiving at least one document at the server, and means for storing relevant pages of the at least one document, wherein each page is associated with at least one relevant party in the taxonomy.

The embodiments also relate to a computer-readable medium for managing a collaborative deal closing process that provides a means for tracking and managing signature pages of a closing deal using a taxonomy displayable by a computing device including means for receiving a list of users that are authorized to access the closing deal, the list including an identifier associated with each of the users, means for storing the list of authorized users, means for parsing the identifier associated with each user, means for grouping the users according to parties based on the identifier, means for creating a taxonomy including a listing of documents relevant to the deal and a listing of the parties of the deal, means for receiving at least one document at the server, and means for storing relevant pages of the at least one document, wherein each page is associated with at least one relevant party in the taxonomy.

The computer-implemented method for managing a collaborative deal closing process that provides a means for tracking and managing signature pages of a closing deal using a taxonomy displayable by a computing device may include that the taxonomy is displayed in the form of a grid with the listing of the documents relevant to the deal on one axis, and the listing of the parties of the deal on another axis, that the taxonomy is displayed to include at least one cell that corresponds to a signature page that is to be signed by an individual of a particular party, that the taxonomy is displayed in the form of a spreadsheet, parsing content of the relevant pages, suggesting individual files for each of the relevant pages to be stored, storing the relevant pages in individual files, wherein an individual file is associated with an individual cell of the taxonomy, designating each cell on the grid with a particular status, modifying the status of a particular cell after a signature page is stored in an individual file, wherein the receiving step may include receiving an email from a sender that includes at least one attachment, allocating the at least one attachment to a particular user on the grid based on the email address of the sender, wherein the email is received at a dedicated email address, wherein the grid includes rows and columns, labeling each row and column on the grid, wherein the row labels include at least one of document labels and signatories, wherein the column labels include at least one of document labels and signatories, activating the at least one cell to be enabled to receive at least one signature page, wherein the grid includes at least one communication feature, wherein the at least one communication feature includes a common message pane that enables the users to edit status notes and comments for each row and column of the deal grid, and a task list that enables the users to include notes that are viewable by each of the users, receiving a deal transaction template to be used for the closing deal, selecting a deal transaction template to be used for the closing deal from a list of previous closing deals, and removing information related to a previous deal transaction from the selected closing deal template, creating a table of contents based on the labels of each row and column on the grid, collating the pages of the stored at least one document into a closing book, storing the closing book, wherein the relevant pages of the at least one document include at least one signature page, tracking information related to the deal transaction, wherein the information includes at least one of a contact list including contact information for each user on the list, deal dates, billing codes, wire instructions, deal definitions, an audit log of user activity on the deal grid, and a status report presented as news feed of any changes made to the deal grid, separating pages of the at least one document, if the document contains multiple pages, parsing content of the relevant pages, storing the relevant pages in individual files, based on the parsed content, blocking at least one party's access to view particular relevant pages, generating a taxonomy template including specifications for the deal transaction, copying newly stored relevant pages to the computing device in a batch interval, and wherein the list of authorized users and the relevant pages are stored in at least one of a database on a server or on a computing device.

The system for managing a collaborative deal closing process that provides a means for tracking and managing signature pages of a closing deal using a taxonomy displayable by a computing device may include that the taxonomy is displayed in the form of a grid with the listing of the documents relevant to the deal on one axis, and the listing of the parties of the deal on another axis, that the taxonomy is displayed to include at least one cell that corresponds to a signature page that is to be signed by an individual of a particular party, that the taxonomy is displayed in the form of a spreadsheet, means for parsing content of the relevant pages, means for suggesting individual files for each of the relevant pages to be stored, means for storing the relevant pages in individual files, wherein an individual file is associated with an individual cell of the taxonomy, means for designating each cell on the grid with a particular status, means for modifying the status of a particular cell after a signature page is stored in an individual file, wherein the receiving step includes receiving an email from a sender that includes at least one attachment, means for allocating the at least one attachment to a particular user on the grid based on the email address of the sender, wherein the email is received at a dedicated email address, wherein the gird includes rows and columns, means for labeling each row and column on the grid, wherein the row labels include at least one of document labels and signatories, wherein the column labels include at least one of document labels and signatories, means for activating the at least one cell to be enabled to receive at least one signature page, wherein the grid includes at least one communication feature, wherein the at least one communication feature includes a common message pane that enables the users to edit status notes and comments for each row and column of the deal grid, and a task list that enables the users to include notes that are viewable by each of the users, means for receiving a deal transaction template to be used for the closing deal, means for selecting a deal transaction template to be used for the closing deal from a list of previous closing deals, and means for removing information related to a previous deal transaction from the selected closing deal template, means for creating a table of contents based on the labels of each row and column on the grid, means for collating the pages of the stored at least one document into a closing book, means for storing the closing book, wherein the relevant pages of the at least one document include at least one signature page, means for tracking information related to the deal transaction, wherein the information includes at least one of a contact list including contact information for each user on the list, deal dates, billing codes, wire instructions, deal definitions, an audit log of user activity on the deal grid, and a status report presented as news feed of any changes made to the deal grid, means for separating pages of the at least one document, if the document contains multiple pages, parsing content of the relevant pages, means for storing the relevant pages in individual files, based on the parsed content, means for blocking at least one party's access to view particular relevant pages, means for generating a taxonomy template including specifications for the deal transaction, means for copying newly stored relevant pages to the computing device in a batch interval, and wherein the list of authorized users and the relevant pages are stored in at least one of a database on a server or on a computing device.

BRIEF DESCRIPTION OF THE DRAWINGS

The invention is described through a preferred embodiment and the attached drawings in which.

DETAILED DESCRIPTION OF THE PREFERRED EMBODIMENT

Applicant has discovered that it would be advantageous to have a deal stage for storing the relevant pages of a deal transaction, using a taxonomy that provides a transparent means for tracking and managing the signature pages of the deal transaction.

Figure 1:
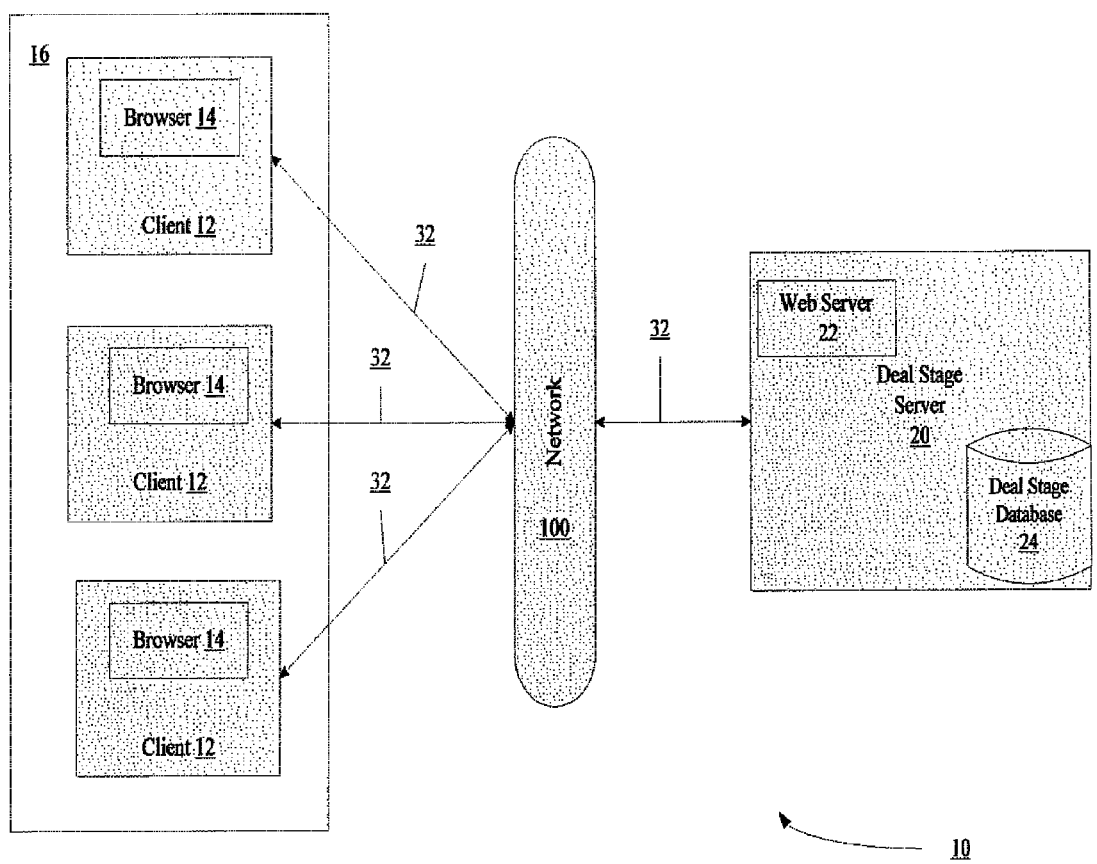
FIG. 1 is a block diagram of a computer architecture in accordance with the preferred embodiment of the invention including a deal stage server.

A preferred embodiment of a computer architecture of the invention is illustrated in FIG. 1. Deal stage system 10 includes a client system 16 that may be made up of one client computer or a plurality of client computers 12, which each execute browser application 14 that supports an HTTP protocol, or other appropriate protocols. The client computers 12 are connected to the network 100, e.g., the Internet. For example, the client computers 12 can be connected through an ISP (Internet Service Provider), serving as a communication channel, to the Internet. Furthermore, a client computer 12 can be coupled to the Internet through a broadband connection such as ISDN (Integrated Services Digital Network), a cable modem, or a DSL (Digital Subscriber Line) connection. Deal stage server 20 is also coupled to the network 100 in a known manner. The deal stage server 20 executes, for example, a Web server control application 22, known as an HTTP server application, stored in a memory device. Additionally, public domain web server software applications from NCSA or APACHE can be used.

In the preferred embodiment, both the client computer 12 and the deal stage server 20 can be capable of communicating using a secure connection protocol, such as SSL or S-HTTP. Although a non-secure connection may be used, only a secure connection 32 is illustrated for the purposes of clarity. Typically, non-secure and secure connections will be effected over the same physical connection or communication channel, such as the Internet. Further, deal stage server 20 can have records of many deal stages stored in memory devices thereof, in the form of an index for example. Deal stage server 20 also includes deal stage database 24 stored in the memory device thereof as described in detail below. The deal stage database 24 may store the deal stages being used in current deal transactions, deal stage templates used in previous deal transactions, and/or blank deal stage templates.

Client computer 12 can request a display of a deal stage from deal stage server 20 by issuing a URL request through Internet 100 to deal stage server 20. For example, a user of client computer 12, i.e., an authorized individual involved in a deal transaction, may access a deal stage platform, which is displayed by browser 14. Deal stage database 24 can include records of deal stages that are in current use and deal stages used in previous deal transactions. The deal stage database 24 may also include information such as the parties involved, a list of users authorized to access the deal stage of current and/or previous transaction deals, the taxonomy used in tracking and managing the relevant pages of a current and/or previous deal, among other things. A deal transaction may include at least one of mergers, acquisitions, fundraising, insolvency, corporate restructuring, joint ventures, closing deals, and/or any exchange, whether it be monetary and/or fungible in nature, between two parties or entities.

Figure 2:
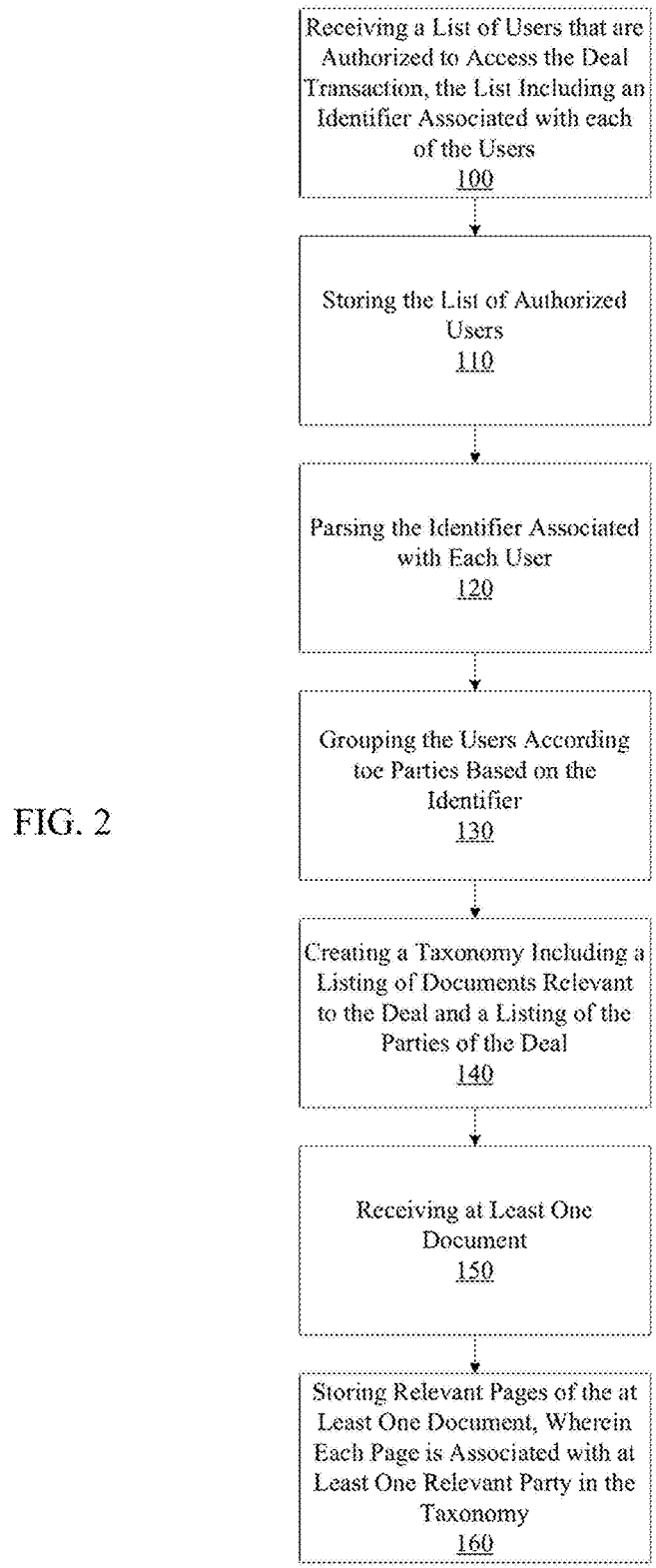
FIG. 2 is a flowchart of managing a collaborative deal transaction that provides for tracking and managing relevant pages of a deal transaction using a taxonomy displayable by a computing device.

FIG. 2 illustrates a flowchart for managing a collaborative deal transaction process that provides for tracking and managing signature pages of a deal transaction using a taxonomy that is displayable by a computing device. Each step of FIG. 2 will be described in greater detail below. In step 100, a list of users that are authorized to access the deal transaction is received, wherein the list includes an identifier associated with each user. The identifier may include, for example, an email address, a domain name, the name of a company or group, metadata, keywords, or any combination thereof. Next, in step 110, the list of authorized users is stored. Then, the identifier associated with each user is parsed in step 120, and the users are grouped according to parties based on the identifier in step 130. By way of example, if two law firms are representing the opposing sides of a merger or acquisition, and the email address of the users authorized to access the deal stage from each law firm are sent to the deal stage, the email addresses of the users can then be parsed, and the users may be grouped based on the domain names of the email addresses, i.e., grouped according to law firm.

After which, in step 140, a taxonomy is created that includes a listing of documents relevant to the deal and a listing of the parties of the deal. The taxonomy may be displayed as any conceivable form or configuration. More specifically, the taxonomy may be displayed as a grid including rows and columns, a chart, a diagram, a graph, a spread sheet, a spoke and wheel diagram, a pie chart, a bar graph, a tree diagram, a venn diagram, a histogram, or any combination thereof, just to name a few. A taxonomy that is displayed as a grid may have the listing of the documents relevant to the deal on one axis, and the listing of the parties and/or users who will sign the documents of the deal on the other axis.

Furthermore, the taxonomy may include at least one cell that corresponds to a signature page that is to be signed by an individual of a particular party involved in the deal. Each cell in the taxonomy may include a particular status, such as inactive, active empty, new, flagged, occupied invisible, and read, just to name a few. Once the taxonomy is created, the cells may be activated, for example by being "toggled" on, thus the files associated with each cell are enabled to store at least one relevant page of a document. Additionally, the taxonomy may include at least one communication feature. The communication feature can include at least one of a common message pane that enables the users to edit status notes and comments for each row and column of the deal grid, and a task list that enables the users to include notes that are viewable by each of the users.

The at least one cell may be a cell of a spread sheet, a section of a pie chart, a bar in a bar graph, a circle and/or an ellipse in a venn diagram, a circle in a wheel and spoke diagram, or any portion of the taxonomy that is created. Regarding the creation of a grid taxonomy, each row and column of the grid is labeled, wherein the row labels may include at least one of a document label, a signatory, a party, a law firm, a company, a foundation, an entity, and/or a lender involved in the deal. In addition, the column labels may include at least one of a document label, a signatory, a party, a law firm, a company, a foundation, an entity, and/or a lender involved in the deal.

The creation of the taxonomy in step 140 may further include receiving a taxonomy template of a previous deal transaction. Additionally, the step of creating the taxonomy 140 may include the steps of selecting a taxonomy template to be used for the deal transaction from a list of previous deal transactions, and removing information related to the previous deal transaction from the selected taxonomy template. For instance, a user can be alerted (e.g., by a "pop-up" window or icon) that confidential or sensitive information may remain in the taxonomy template of the previous deal (e.g., if information in certain fields of the template remains unchanged), and that any actual confidential information must be removed before the template can be used as the template for a different deal. By way of another example, a taxonomy template including specifications for a particular deal transaction may be generated as a blank template, or from a blank template.

In step 150, at least one document is received, wherein the document can be received as an email attachment, and the attachment can be allocated to a particular user in the taxonomy (e.g., grid) based on the email address of the sender. In addition, the email may be received at a dedicated email address. If the document contains multiple pages, the pages of the document can be separated. Next, the relevant pages of the at least one document are stored, wherein each page is associated with at least one relevant party in the taxonomy, in step 160. Further, the content of the relevant pages may be parsed, and a suggestion may be made as to the appropriate individual file where each of the relevant pages should be stored. Parsing of the individual content may occur using any known technique, such as optical character recognition (OCR) for example. At least one relevant page is then stored in an individual file, wherein an individual file may be associated with a particular cell in the taxonomy. The relevant pages may be stored in individual files, based on the parsed content. Furthermore, a user may add a document and/or file to the to the deal stage manually, and/or the document and/or file may be selected and uploaded at the deal stage automatically, e.g., using a wizard or process that selects the appropriate document and/or filed from the user's files. As a precautionary function, newly stored relevant pages may be copied to at least one computing device in regular batch intervals.

After a relevant page (e.g., a signature page) is stored in the appropriate file, the status of a cell associated with that signature page is modified to reflect this change. For example, the modification of the cell's status may be that the cell is marked or displayed so that a user can easily see that the relevant page (e.g., the signature page) has been received and stored in the deal stage, or that the user has not yet viewed the file. However, a party's or user's access to view particular relevant pages stored in the deal stage may be blocked, based on the role the party or user has in the deal transaction. The taxonomy may include a feature that automatically displays the status of the cell, and information related to the cell, such as when a user drags a curser over that particular cell, and the status of that cell appears in a "pop-up" window. Furthermore, the information related to the deal transaction may be tracked, wherein the information includes contact information for each user on the list, deal dates, billing codes, wire instructions, deal definitions, an audit log of user activity on the deal stage, and a status report presented as a new feed of any changes made to the deal stage. Thus, the progress of the deal transaction can be easily tracked and managed.

Once all of the relevant pages of the deal transaction have been received and stored in the deal stage, a table of contents can be created, and may be based on the labels of each row and column of the taxonomy (e.g., grid), and the stored relevant pages can be collated into a closing book. The closing book can then be stored at a server and/or at a user computing device or a plurality of user computing devices.

An example of the grid taxonomy 200 described above can be seen in FIG. 3. Cells 210 that correspond to signatures page that is to be signed by an individual of a particular party involved in the deal are also shown. By way of example, shaded cells 215 represent signature pages for a particular document that do not require the signature of the corresponding party or user. A cell labeled with the status identifier "E" 220 can represent that a particular signature page has not been received from the corresponding party or user. A cell designated with the status identifier "S" 225 can represent that a particular signature page has been received from the corresponding party or user. A cell with the status identifier shown by a "pad-lock" 230 indicates that the information in the file, which corresponds to that cell, is not available to be viewed by other users. A cell with a "Δ" 235 status identifier represents that a new version of a signature page or document is required. The above-described status identifiers are merely used as examples. It is understood that the status identifier for the cells may also include any alphanumeric identifier, symbol, drawing, shading, shape, and/or color to illustrate or display any type of status that may be relevant to the documents of a deal transaction taxonomy.

Figure 3:
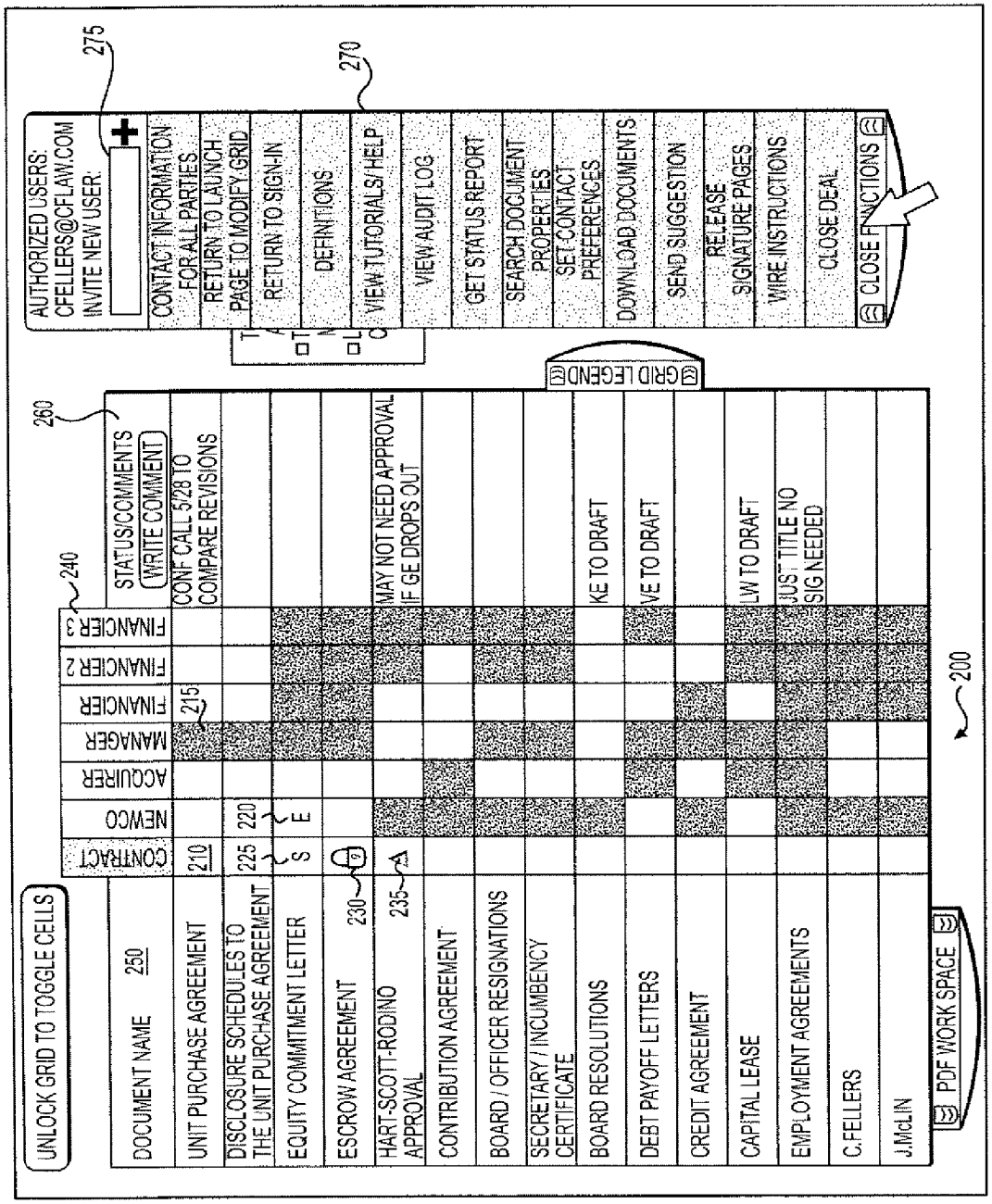
FIG. 3 is a schematic representation of a deal stage taxonomy in accordance with one embodiment of the present invention.

The parties of the deal transaction can be seen in rows 240, and the documents involved in the deal transaction are listed on the columns 250. The communication feature 260 that can include at least one of a common message pane that enables the users to edit status notes and comments for each row and column of the deal grid, and a task list that enables the users to include notes that are viewable by each of the users, is also seen in FIG. 3. Information 270 related to the deal transaction that may be tracked such contact information for each user on the list, deal dates, billing codes, wire instructions, deal definitions, an audit log of user activity on the deal stage, and a status report presented as a new feed of any changes made to the deal stage is presented as a dropdown menu, and includes a feature to invite a new user 275, as seen in FIG. 3.

Thus, the above described method, system, and computer-readable medium in accordance with the embodiments of the present invention, as can now be fully appreciated, provides a very effective method for managing a collaborative deal transaction process that provides for tracking and managing signature pages of a deal transaction using a taxonomy displayable by a computing device.

The invention can be implemented over any type of communications channel, such as the Internet, a local area network (LAN), a wide area network (WAN), direct computer connections, or the like, using any type of communication hardware and protocols. Any type of hardware or combination of hardware can be used for various clients and servers. Accordingly, the term "computer" as used herein, refers to any type of computing device or data terminal, such as a personal computer, a portable computer, a dumb terminal, a thin client, a hand held device or any combination of such devices. The various clients and servers can be a single computer at a single location or multiple computers at a single or multiple locations. For example, a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used herein refers to any collection of information such as a database file, a lookup table, or the like.

The invention has been described through a preferred embodiment. However, various modifications can be made without departing from the scope of the invention as defined by the appended claims and legal equivalents.

The invention claimed is:

1. A computer-implemented method for managing a collaborative deal transaction process that provides for tracking and managing signature pages of a deal transaction using a taxonomy displayable by a computing device, the method comprising the steps of:
  receiving a list of users that are authorized to access the deal transaction, the list including an identifier associated with each of the users;
  storing the list of authorized users;
  parsing the identifier associated with each user, wherein the identifier includes one from the group consisting of an email address, a domain name, a name of a company or group, and any combination thereof of the authorized users;
  grouping the users according to parties based on the identifier;
  creating a taxonomy by the computing device including a listing of documents relevant to the deal and a listing of the parties of the deal;
  receiving at least one document; and
  storing relevant pages of the at least one document, wherein each page is associated with at least one relevant party in the taxonomy.

2. A method according to claim 1, wherein the taxonomy is displayed in the form of a grid with the listing of the documents relevant to the deal on one axis, and the listing of the parties of the deal on another axis.

3. A method according to claim 2, wherein the taxonomy is displayed to include at least one cell that corresponds to a signature page that is to be signed by an individual of a particular party.

4. A method according to claim 1, wherein the taxonomy is displayed in the form of a spreadsheet.

5. A method according to claim 3, wherein the step of storing further comprises:
parsing content of the relevant pages;
suggesting individual files for each of the relevant pages to be stored; and
storing the relevant pages in individual files, wherein an individual file is associated with an individual cell of the taxonomy.

6. A method according to claim 3, further comprising:
designating each cell on the grid with a particular status.

7. A method according to claim 6, wherein the particular status includes inactive, active empty, new, flagged, occupied invisible, and read.

8. A method according to claim 6, further comprising:
modifying the status of a particular cell after a signature page is stored in an individual file.

9. A method according to claim 2, wherein the receiving step includes receiving an email from a sender that includes at least one attachment, and allocating the at least one attachment to a particular user on the grid based on the email address of the sender.

10. A method according to claim 9, wherein the email is received at a dedicated email address.

11. A method according to claim 2, wherein the grid includes rows and columns.

12. A method according to claim 11, further comprising: labeling each row and column on the grid,
wherein the row labels include at least one of document labels and signatories, and wherein the column labels include at least one of document labels and signatories.

13. A method according to claim 3, further comprising:
activating the at least one cell to be enabled to receive at least one signature page.

14. A method according to claim 2, wherein the grid includes at least one communication feature.

15. A method according to claim 14, wherein the at least one communication feature includes a common message pane that enables the users to edit status notes and comments for each row and column of the grid, and a task list that enables the users to include notes that are viewable by each of the users.

16. A method according to claim 1, further comprising:
receiving a deal transaction template to be used for the deal.

17. A method according to claim 1, further comprising:
selecting a deal transaction template to be used for the deal from a list of previous deals; and
removing information related to a previous deal transaction from the selected deal template.

18. A method according to claim 2, further comprising: creating a table of contents based on the labels of each row and column on the grid; and collating the pages of the stored at least one document into a closing book.

19. A method according to claim 18, further comprising:
storing the closing book.

20. A method according to claim 1, wherein the relevant pages of the at least one document include at least one signature page.

21. A method according to claim 2, further comprising:
tracking information related to the deal transaction.

22. A method according to claim 21, wherein the information includes at least one of a contact list including contact information for each user on the list, deal dates, billing codes, wire instructions, deal definitions, an audit log of user activity on the grid, and a status report presented as news feed of any changes made to the grid.

23. A method according to claim 1, further comprising:
separating pages of the at least one document, if the document contains multiple pages.

24. A method according to claim 1, further comprising:
parsing content of the relevant pages; and
storing the relevant pages in individual files, based on the parsed content.

25. A method according to claim 1, further comprising:
blocking at least one party's access to view particular relevant pages.

26. A method according to claim 1, further comprising:
generating a taxonomy template including specifications for the deal transaction.

27. A method according to claim 1, further comprising:
copying newly stored relevant pages to the computing device in a batch interval.

28. A method according to claim 1, wherein the list of authorized users and the relevant pages are stored in at least one of a database on a server or on a computing device.

29. A system for managing a collaborative deal closing process that provides a means for tracking and managing signature pages of a closing deal using a taxonomy displayable by a computing device, the system comprising:
means for receiving a list of users that are authorized to access the closing deal, the list including an identifier associated with each of the users;
means for storing the list of authorized users;
means for parsing the identifier associated with each user, wherein the identifier includes one from the group consisting of an email address, a domain name, a name of a company or group, and any combination thereof of the authorized users;
means for grouping the users according to parties based on the identifier;
means for creating a taxonomy including a listing of documents relevant to the deal and a listing of the parties of the deal;
means for receiving at least one document at the server; and
means for storing relevant pages of the at least one document, wherein each page is associated with a relevant party in the taxonomy.

30. A system according to claim 29, wherein the taxonomy is displayed in the form of a grid with the listing of the documents relevant to the deal on one axis, and the listing of the parties of the deal on another axis.

31. A system according to claim 30, wherein the taxonomy is displayed to include at least one cell that corresponds to a signature page that is to be signed by an individual party.

32. A system according to claim 29, wherein the taxonomy is displayed in the form of a spreadsheet.

33. A system according to claim 29, wherein the means for storing further comprises:
means for parsing content of the relevant pages;
means for suggesting individual files for each of the relevant pages to be stored; and
means for storing the relevant pages in individual files, wherein an individual file is associated with an individual cell of the taxonomy.

34. A system according to claim 31, further comprising:
means for designating each cell on the grid with a particular status.

35. A system according to claim 34, wherein the particular status includes inactive, active empty, new, flagged, occupied invisible, and read.

36. A system according to claim 34, further comprising:
means for modifying the status of a particular cell after a signature page is stored in an individual file.

37. A system according to claim 30, wherein the means for receiving includes means for receiving an email from a sender that includes at least one attachment, and means for allocating the at least one attachment to a particular user on the grid based on the email address of the sender.

38. A system according to claim 37, wherein the email is received at a dedicated email address.

39. A system according to claim 30, wherein the grid includes rows and columns.

40. A system according to claim 39, further comprising:
means for labeling each row and column on the grid,
wherein the row labels include at least one of document labels and signatories, and wherein the column labels include at least one of document labels and signatories.

41. A system according to claim 31, further comprising:
means for activating the at least one cell to be enabled to receive at least one signature page.

42. A system according to claim 30, wherein the grid includes at least one communication feature.

43. A system according to claim 42, wherein the at least one communication feature includes a common message pane that enables the users to edit status notes and comments for each row and column of the grid, and a task list that enables the users to include notes that are viewable by each of the users.

44. A system according to claim 29, wherein the step of creating the taxonomy further comprises:
means for receiving a taxonomy template to be used for the deal.

45. A system according to claim 29, wherein the step of creating the taxonomy further comprises:
means for selecting a taxonomy to be used for the deal from a list of previous deals; and
means for removing information related to a previous deal from the selected taxonomy template.

46. A system according to claim 30, further comprising:
means for creating a table of contents based on the labels of each row and column on the grid; and
means for collating the pages of the stored at least one document into a closing book.

47. A system according to claim 46, further comprising:
means for storing the closing book.

48. A system according to claim 29, wherein the relevant pages of the at least one document include at least one signature page.

49. A system according to claim 30, further comprising:
means for tracking information related to the deal.

50. A system according to claim 49, wherein the information includes at least one of a contact list including contact information for each user on the list, deal dates, billing codes, wire instructions, deal definitions, and an audit log of user activity on the grid, and a status report presented as news feed of any changes made to the grid.

51. A system according to claim 29, further comprising:
means for separating pages of the at least one document, if the document contains multiple pages.

52. A system according to claim 29, further comprising:
means for parsing content of the relevant pages; and
means for storing the relevant pages in individual files, based on the parsed content.

53. A system according to claim 29, further comprising:
means for blocking at least one party's access to particular relevant pages.

54. A system according to claim 29, further comprising:
means for generating a taxonomy template including specifications for the deal.

55. A system according to claim 29, further comprising:
means for copying newly stored relevant pages to the computing device in a batch interval.

56. A system according to claim 29, wherein the list of authorized users and the relevant pages are stored in at least one of a database on a server or on a computing device.

57. A method according to claim 1, wherein the deal transaction includes at least one of a merger, an acquisition, fundraising, insolvency, corporate restructuring, a joint venture, a closing deal, a monetary exchange between two parties, and a fungible exchange between two parties.

58. A system according to claim 29, wherein the deal includes at least one of a merger, an acquisition, fundraising, insolvency, corporate restructuring, a joint venture, a closing deal, a monetary exchange between two parties, and a fungible exchange between two parties.

59. A non-transitory computer readable medium including instructions for tracking and managing signature pages of a closing deal using a taxonomy displayable by a computing device, the computer readable medium comprising:
instructions receiving a list of users that are authorized to access the closing deal, the list including an identifier associated with each of the users;
instructions storing the list of authorized users;
instructions parsing the identifier associated with each user, wherein the identifier includes one from the group consisting of an email address, a domain name, a name of a company or group, and any combination thereof of the authorized users;
instructions grouping the users according to parties based on the identifier;
instructions creating a taxonomy including a listing of documents relevant to the deal and a listing of the parties of the deal;
instructions receiving at least one document at the server; and
instructions storing relevant pages of the at least one document, wherein each page is associated with a relevant party in the taxonomy.

* * * * *